United States Patent
Chen et al.

(10) Patent No.: US 7,956,977 B2
(45) Date of Patent: Jun. 7, 2011

(54) LIQUID CRYSTAL DISPLAY HAVING SEALANT OBSERVATION WINDOWS

(75) Inventors: Hsiao-Fen Chen, Padeh (TW);
Chen-Chi Lin, Padeh (TW);
Hung-Cheng Lin, Padeh (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 478 days.

(21) Appl. No.: 11/512,193

(22) Filed: Aug. 30, 2006

(65) Prior Publication Data
US 2007/0268445 A1 Nov. 22, 2007

(30) Foreign Application Priority Data
May 19, 2006 (TW) .............................. 95117884 A

(51) Int. Cl.
*G02F 1/1339* (2006.01)
*G02F 1/13* (2006.01)

(52) U.S. Cl. .................... 349/153; 349/190; 349/192

(58) Field of Classification Search .............. 349/153, 349/190, 192
See application file for complete search history.

(56) References Cited

U.S. PATENT DOCUMENTS

| 6,111,357 | A  | * | 8/2000 | Fleming et al. | ............... 313/509 |
| 6,424,394 | B1 | * | 7/2002 | Morii | ............................. 349/153 |
| 7,019,800 | B2 | * | 3/2006 | Kuo | ................................. 349/153 |
| 7,253,866 | B2 | * | 8/2007 | Moon et al. | ..................... 349/153 |
| 2002/0131009 | A1 | * | 9/2002 | Takeuchi | ....................... 349/153 |
| 2004/0085488 | A1 |   | 5/2004 | Cho et al. | |

FOREIGN PATENT DOCUMENTS

| JP | 08242446 | 9/1996 |
| JP | 2005318497 | 11/2005 |
| KR | 20000015558 | 3/2000 |
| KR | 20050067083 | 6/2005 |

* cited by examiner

*Primary Examiner* — Mark A Robinson
*Assistant Examiner* — Paisley L Arendt
(74) *Attorney, Agent, or Firm* — Jianq Chyun IP Office

(57) ABSTRACT

A liquid crystal display includes: a first substrate and a second substrate; a liquid crystal layer filling between the first substrate and the second substrate; and a plurality of sealant observation windows arranged on the second substrate, wherein each sealant observation windows is an enclosed pattern formed by smooth curve; and a sealant covering a portion of sealant observation windows and surrounding the liquid crystal layer to bond the first substrate and the second substrate. In the present invention, those sealant observation windows can avoid the condition of unequal cell gap and increase the convenience of monitoring the spreading condition of the sealant.

12 Claims, 5 Drawing Sheets

LIQUID CRYSTAL DISPLAY HAVING SEALANT OBSERVATION WINDOWS

BACKGROUND OF THE INVENTION

1. Field of the Invention

The present invention is related to a liquid crystal display. More particularly, the present invention provides a liquid crystal display to enhance the uniformity of the sealant.

2. Description of the Prior Art

In the fabrication process of the Thin Film Transistor-Liquid Crystal Display TFT-LCD, the control of sealing width and cell gap has great influence on the final product quality.

The sealant surrounding the panel is to bond the upper and lower substrates. Normally, the material of the sealant is doped with some spacers to provide the supporting force for the upper and lower substrates. Because the spacer has a grain shape, it is easy to cause the unequal cell gap once the spacers are clustered in the alignment and press process. The unequal cell gap only needs a few micrometers to induce an inhomogeneous distribution of electrical field, so as to deteriorate the gray level performance of the liquid crystal.

If the sealing width is too narrow, it will have several problems such as the bad outagassing in the sequential alignment and press process, the incomplete filling of liquid crystal, the non-uniformity of the cell gap, or the blank frame phenomenon in some region of the sealant frame, etc. If the sealing width is too wide, the dicing difficulty will be increased by several reasons such as the sealant peeling during the spreading of the alignment film, or the pollution to the liquid crystal owing to the sealant is too close to the display region, etc.

Consequently, the stability of the sealing width and the control of the cell gap are the important issues that need to be faced and improved in the fabrication process of TFT-LCD. The Japan patent JP-11-223841 discloses a method of improving the uniformity of the cell gap, which sets up a dummy pattern of the sealant in the edge of the display panel. In the array-side substrate, the dummy pattern is set on the source line and the opposite side of source. In the CF-side substrate, the dummy pattern is set in the position corresponding to the array electrode. Besides, the U.S. Pat. No. 6,018,380 discloses the way to overcome the sealant pollution of the display region is suggested in the prior art, that the substrate can be dug trenches or blocked an extrusion to prevent the sealant from flowing into the display region.

Generally, for monitoring the condition of the sealant spreading, the metal layer in the TFT-side that is passed by the sealant is often dug holes or trenches, so called the sealant observation windows. The light irradiates the TFT-side substrate, and then passes through the liquid crystal layer to the black matrix (BM) of the CF-side substrate. The purpose of monitoring the condition of the sealant spreading is achieved by observing some of the light reflected to the TFT-side. The FIG. 1A and FIG. 1B are the partial schematic diagrams of the sealant observation windows for monitoring the condition of the sealant spreading. The FIG. 1A shows that the sealant observation windows 100 can be set up as the opened holes or the trenches with long shape to observe the sealant 200. Because the total width "D" of the sealant observation windows 100 is normally a little wider than the width "d" of the sealant, the sealant 200 will diffuse toward both the two ends of the sealant observation windows 100 during the press process. The inner spacer of the sealant 200 is easy to accumulate in the corner "A" to form a thicker cell gap, so as to cause the unequal cell gap. Furthermore, referring to the FIG. 1B, the permutation of the sealant observation windows in the prior art is equal spaced and parallel. It is unable to observe the spreading condition when the sealant 200 is shifted or its edge happens to locate in the region "B" between each the sealant observation windows.

SUMMARY OF THE INVENTION

In order to solve the foregoing problems, one intention of the present invention is to provide a liquid crystal display such that the sealant may be uniformly diffused by the design and allocation of the sealant observation windows. Therefore, the condition of unequal cell gap may be avoided and the convenience of monitoring will be improved.

In order to improve the invisible situation when spreading the sealant between each the sealant observation windows, another purpose of the present invention is to provide a liquid crystal display such that the blind points may be reduced by the interlaced allocation of the sealant observation windows.

In order to solve the unequal cell gap caused by the spacer accumulation in the corner owing to the shape of the sealant observation windows, another purpose of the present invention is to provide a liquid crystal display for overcoming the spacer accumulation by the shape design of the sealant observation windows.

Another purpose of the present invention is to provide a liquid crystal display such that the scale, arrow, or patterned indices can be formed simultaneously when the sealant observation windows are formed. Accordingly, it is convenient to monitor whether the spreading condition of the sealant is matched to the original design or not. In other words, the observation convenience is greatly increased.

Another purpose of the present invention is to provide a liquid crystal display such that the unequal cell gap can be reduced and the observation convenience can be increased without adding any additional processes and masks. Accordingly, the yield will be effectively elevated and the production cost will be lower down.

To achieve the foregoing purposes, one embodiment of the liquid crystal display of the present invention includes a first substrate and a second substrate; a liquid crystal layer filling between the first substrate and the second substrate; a plurality of sealant observation windows arranged on the second substrate, wherein each sealant observation windows is an enclosed pattern formed by smooth curve; and a sealant covering a portion of sealant observation windows and surrounding the liquid crystal layer to bond the first substrate and the second substrate.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 3A:
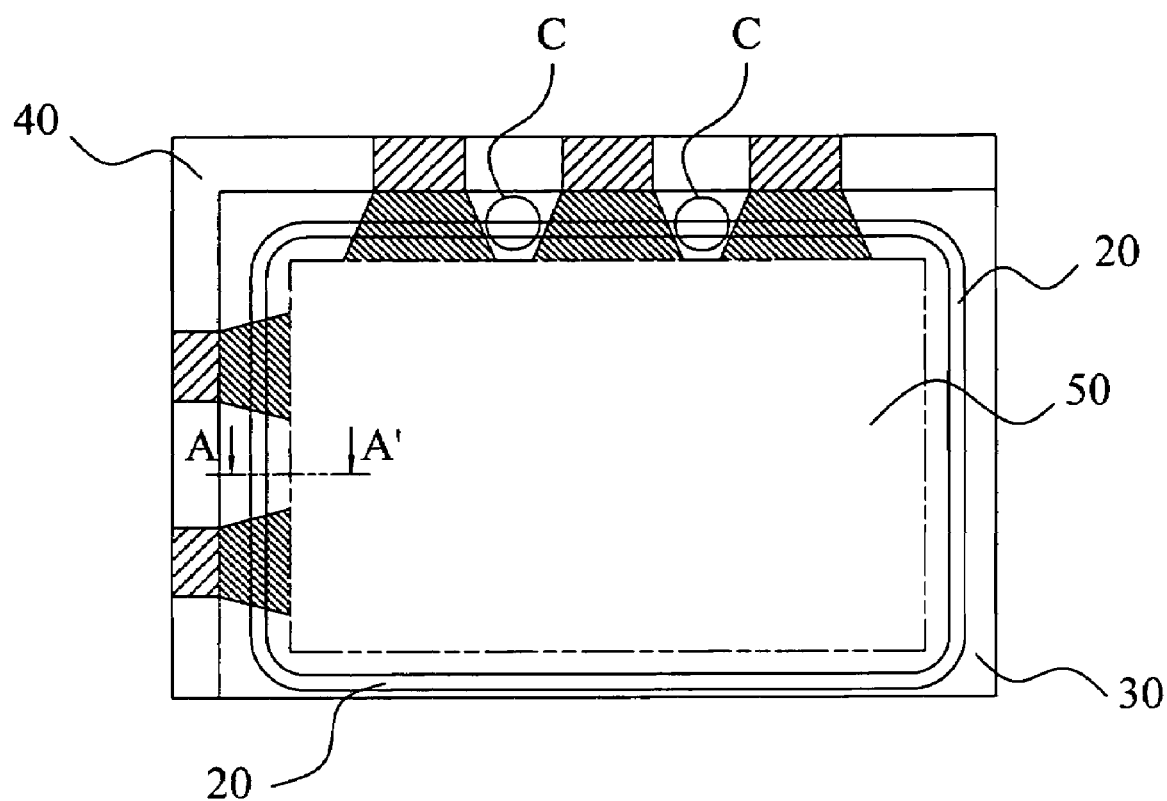
FIG. 3A is a planar schematic diagram of the liquid crystal display according to one embodiment of the present invention.
Figure 3B:
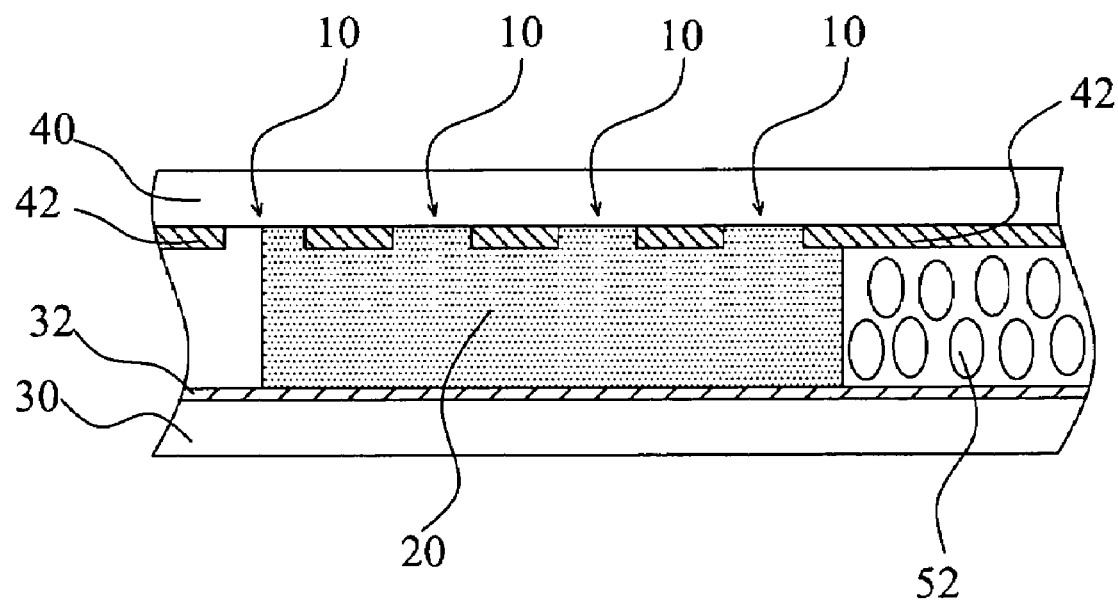
FIG. 3B is a cross-section schematic diagram according to the A-A' cross-section line of FIG. 3A.

FIG. 3A is a planar schematic diagram of the liquid crystal display according to one embodiment of the present invention and FIG. 3B is a cross-section schematic diagram according to the A-A' cross-section line of FIG. 3A. In the present invention, the liquid crystal display includes a first substrate 30 and the first substrate 30 has a black matrix layer 32 on one surface thereof. A second substrate 40 is arranged at the corresponding position with the first substrate 30 and the second substrate 40 has the TFT (not shown in the figure) thereon. A liquid crystal layer 52 is filled between the first substrate 30 and the second substrate 40 and a sealant 20 is used to bond the first substrate 30 and the second substrate 40. The sealant 20 is to surround the display region 50 of the liquid crystal display and the liquid crystal layer 52 is within the display region 50. The sealant will be left an entrance opening in a specific position for the liquid crystal to sequentially inject into the display region. The second substrate 40 includes a sealant observation area C located outside the display region. The sealant observation area C includes a plurality of openings with enclosed pattern and those openings are sealant observation windows 10. The enclosed pattern is an enclosed pattern with smooth curve. Those sealant observation windows 10 are used to monitor the spreading condition of the sealant and each sealant observation windows 10 is interlaced arranged with each other.

To continue the above explanation, the sealant observation area C is located outside the display region and formed by a metal layer, wherein the metal layer is used for forming at least one of the gate electrode and the source and drain electrode and an etching process is utilized to form concave trench with smooth curve of the periphery on the second substrate 40 having TFT thereon. Additionally, sealant observation windows 10 are the metal layer 42 and close openings with smooth curve of sealant observation windows 10 are distributed on the metal layer 42 in an interlaced allocation. These openings are exposed on the surface of the second substrate 40.

Figure 1A:
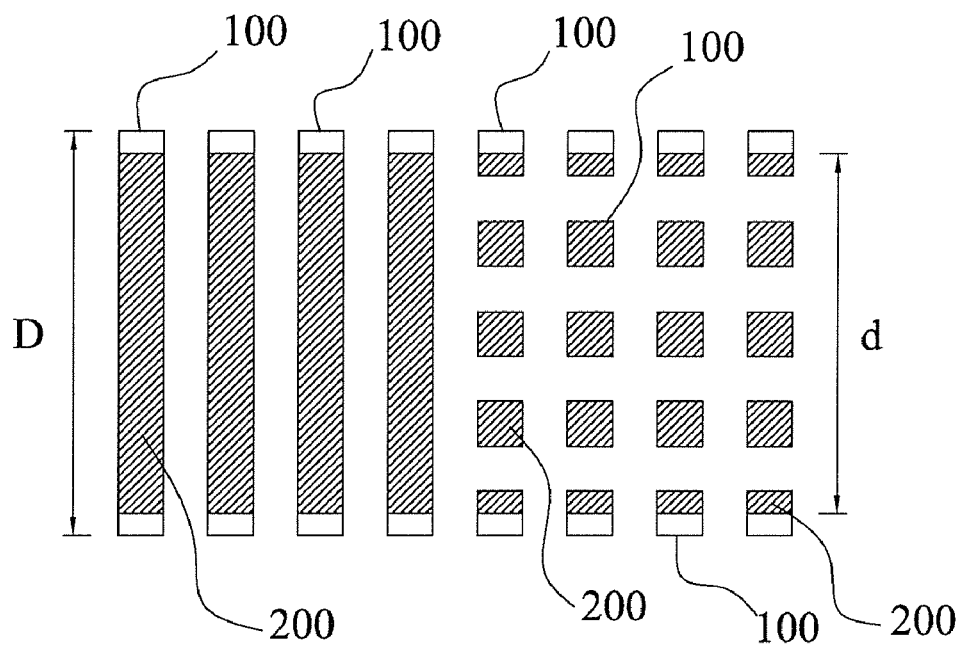
FIG. 1A and FIG. 1B are the partial schematic diagrams of the sealant observation windows for monitoring the condition of the sealant spreading in the prior art.
Figure 1B:
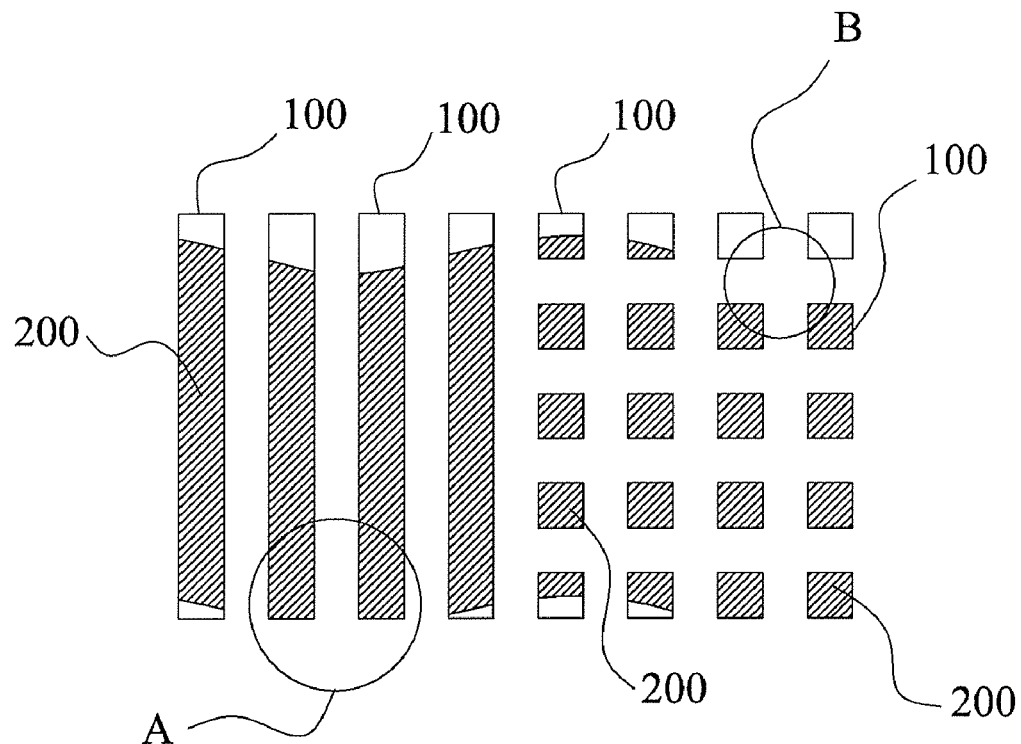
Figure 2A:
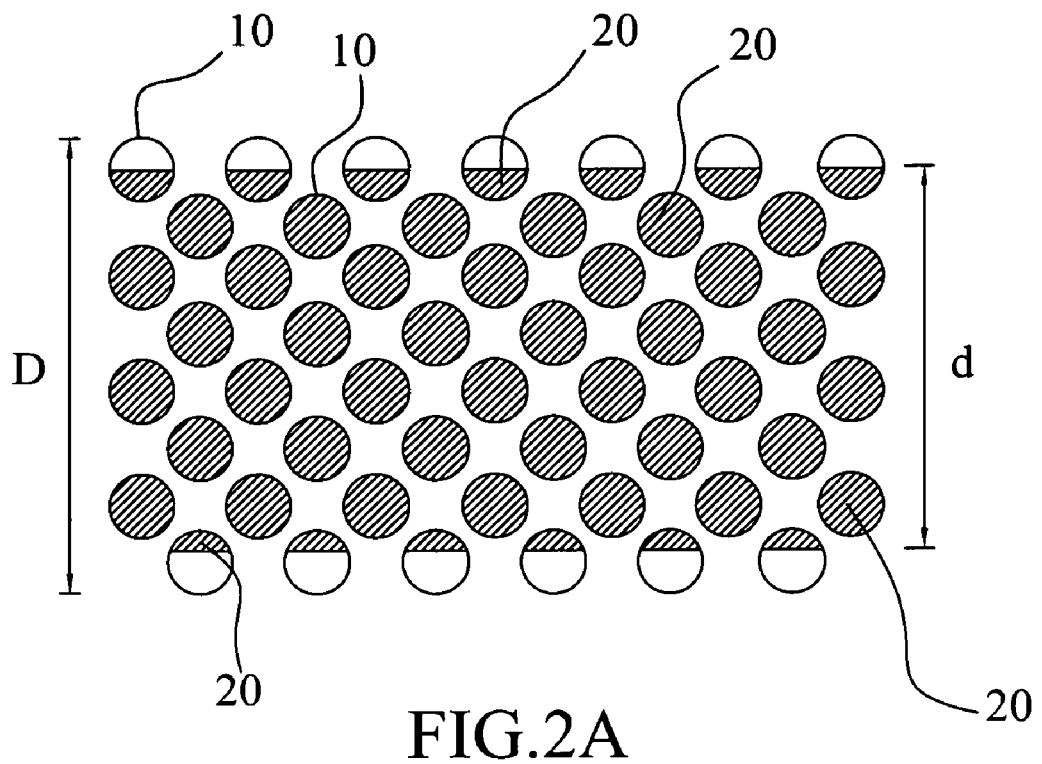
FIG. 2A and FIG. 2B are schematic diagrams to show the sealant observation windows according to one embodiment of the present invention.
Figure 2B:
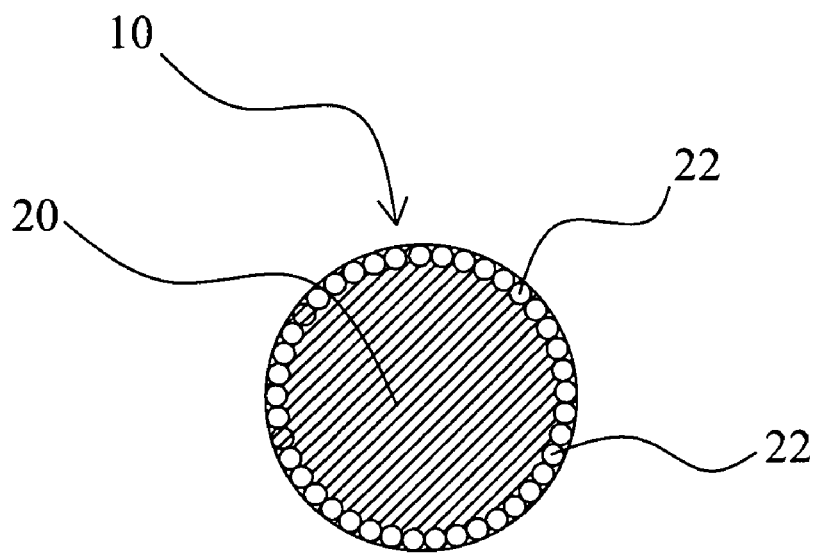

The FIG. 2A and FIG. 2B are the partial front view schematic diagrams to show the sealant observation windows in the condition of the sealant spreading for liquid crystal display according to one embodiment of the present invention. As shown in the FIG. 2A, the total width "D" of the plural sealant observation windows 10 is a little wider than the width "d" of the sealant in this embodiment. The sealant 20 may diffuse toward the two ends of the sealant observation window 10 when pressing and attaching the upper and lower substrates of the LCD display panel. The sealant observation windows 10 have the shape of round opening. The light (not shown in the figures) irradiates the TFT-side substrate, and then enters the round opening and passes through the liquid crystal layer to the black matrix (BM) of the CF-side substrate. The purpose of monitoring the condition of the sealant 20 spreading is achieved by observing some of the light reflected to the TFT-side substrate. In this embodiment, the sealant observation windows 10 with round opening are permuted in an interlaced allocation. This kind of allocation is different from the equal spaced and parallel allocation in the prior art. By this kind of allocation, the sealant observation windows 10 have an overlapped section between each other in the direction of the sealant 20 spreading. And the blind points of observing the condition of the sealant 20 spreading between each the sealant observation windows 10 will be eliminated by a interlaced allocation of the sealant observation windows, the condition of the sealant 20 spreading can be more accurately and clearly observed. Besides, the sealant observation area composed of a plurality of the sealant observation windows can be arbitrarily designed and assembled according to the different spatial position, shape, and size.

Figure 2C:
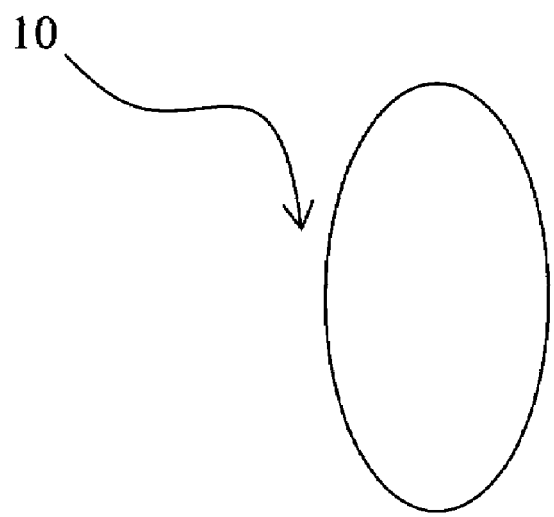
FIG. 2C and FIG. 2D are schematic diagrams to show the shape of sealant observation windows according to different embodiments of the present invention.
Figure 2D:
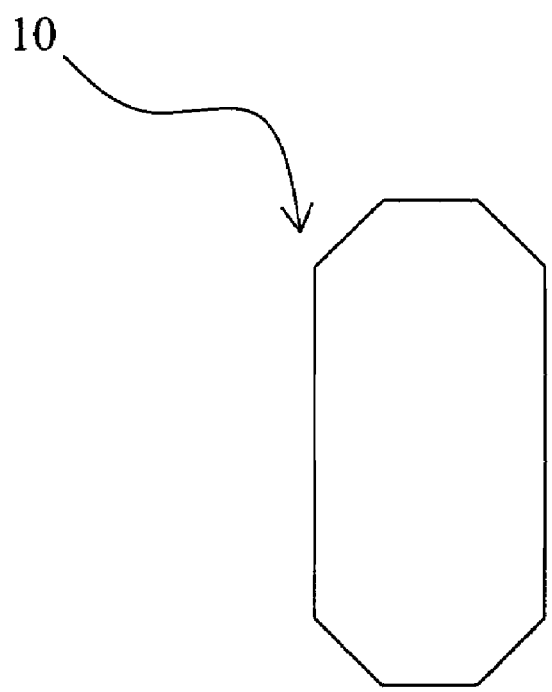

To continue the above explanation, please refer to the FIG. 2B that is the front view schematic diagram to show a sealant observation window 10 with the round opening. The sealant 20 is doped with some spacers 22 to provide the supporting force for the upper and lower substrates. Because the sealant observation window is a concave trench with smooth curve of the periphery and the spacer has a grain shape, the spacers 22 will be uniformly accumulated in the inner rim of the round opening during the alignment and press process. The curved inner rim of the round opening will not induce the spacers 22 to cluster and accumulate in some particular positions. In other words, the clustered accumulation of spacers 22 in the angled corner can be effectively reduced if only the opening shape of the sealant observation window 10 is a closed shape with smoothly changing angle such as the circle, ellipse, or polygon, such as shown in FIG. 2C and FIG. 2D.

Figure 4:
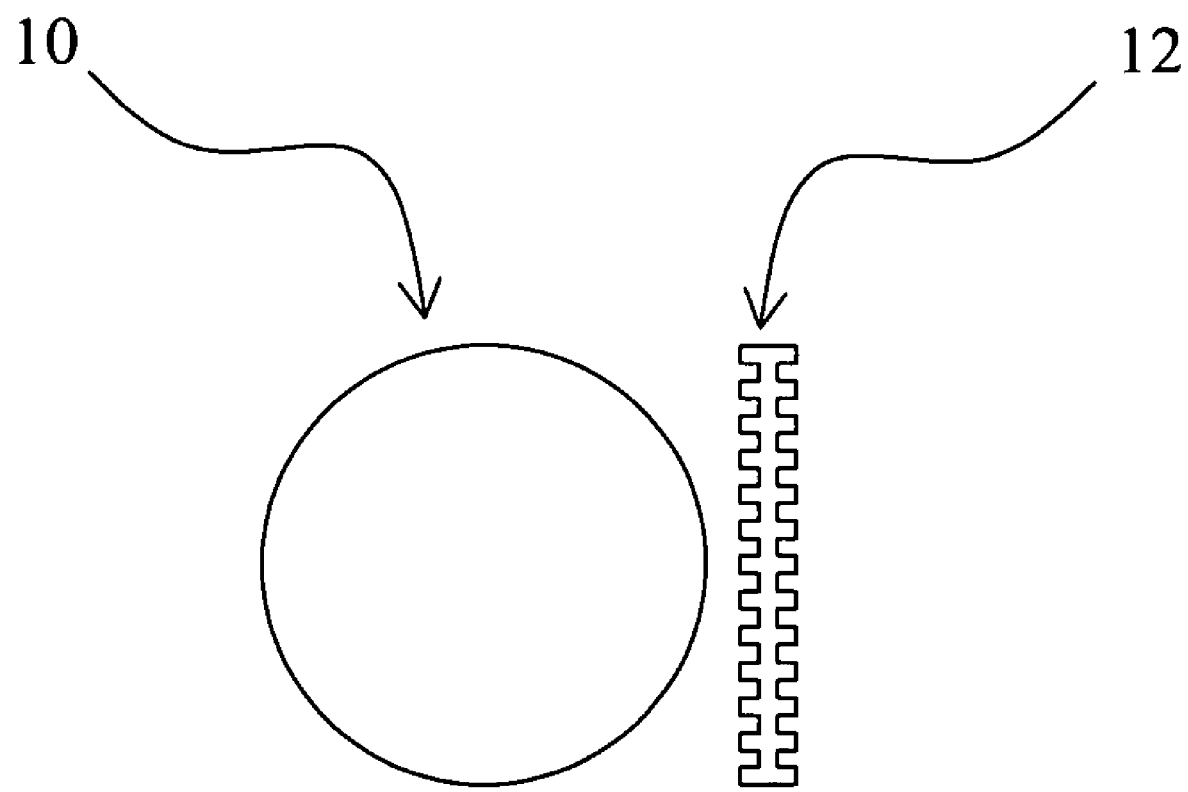
FIG. 4 is a front view schematic diagram of the sealant observation window in one embodiment of the present invention.

FIG. 4 is a front view schematic diagram of the sealant observation window in one embodiment of the present invention. In the present invention, an index pattern 12 is set near the sealant observation window 10 to further monitor whether the spreading condition of the sealant is matched to the design value and shifted value or not. In this embodiment, both the index pattern 12 and the sealant observation windows 10 are the openings formed by removing some portions of the metal layer. Except the scale shape as shown in the figure, the index pattern 12 can be designed as any arbitrary shape such as the arrow type. The index pattern 12 can also be set in the sealant observation window (not shown in the figure).

According to the above description, one feature of the present invention is changing the pattern of the sealant observation windows to accumulate the sealant in the corners of the sealant observation windows after spreading. The more smoothly that the angle changes, the more uniformly that the sealant and spacer distribute. Therefore, the objective of uniform cell gap is achieved. Another feature of the present invention is changing the allocation of the sealant observation windows to the interlaced allocation, the spreading condition may be monitored by the adjacent sealant observation windows through the overlapped section of the sealant observation windows. The foregoing embodiments are just some examples, so the others skilled in the art can easily understand that the shape of the sealant observation windows is not limited by the foregoing embodiments. Moreover the positions of the allocation can be arranged according to the spatial condition, the sealant observation windows of the allocation can be closely adjacent and interlaced in the situation of limited space.

To sum up the foregoing descriptions, the present invention can avoid the unequal cell gap situation and increase the convenience of monitoring by the pattern design and allocation of the sealant observation windows in the TFT-side substrate to make the sealant be uniformly diffused after spreading. In order to improve the invisible situation when spreading the sealant between the sealant observation windows, the present invention is to provide an interlaced allocation of the sealant observation windows to reduce the monitoring of blind points. Further, in order to solve the unequal cell gap caused by the spacer accumulation in the angled corner owing to the shape of the sealant observation windows, the present invention overcome the spacer accumulation by the shape design of the sealant observation windows. And, the present invention can form the scale, arrow, or patterned indices simultaneously when the sealant observation windows are formed. Accordingly, it is convenient to monitor whether the spreading condition of the sealant is matched to the original design or not. In other words, the observation convenience is greatly increased. Moreover the unequal cell gap can be reduced and the observation convenience can be increased without adding any additional process and mask. Accordingly, the yield will be effectively elevated and the production cost will be lower down.

The foregoing descriptions of specific embodiments of the present invention have been presented for purposes of illustrations and description. They are not intended to be exclusive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to particular use contemplated. It is intended that the scope of the invention be defined by the claims appended hereto and their equivalents.

What is claimed is:

1. A liquid crystal display, comprising:
a first substrate and a second substrate;
a liquid crystal layer filled between said first substrate and said second substrate;
a layer having a plurality of sealant observation windows on said second substrate, wherein each of said sealant observation windows is an enclosed pattern with a smooth curve, wherein an index pattern is disposed near each of said sealant observation windows, the index pattern has a plurality of scale patterns arranged along a direction, and the plurality of scale patterns of the index pattern respectively align to different parts of each of the sealant observation windows; and
a sealant covering a portion of said sealant observation windows and surrounding said liquid crystal layer to bond said first substrate and said second substrate, wherein a gap between the adjacent scale patterns is suitable for evaluating a shift value of the sealant.

2. The liquid crystal display according to claim 1, wherein said sealant observation windows expose a portion of said second substrate.

3. The liquid crystal display according to claim 1, wherein said layer having said sealant observation windows is a metal layer.

4. The liquid crystal display according to claim 3, wherein said metal layer is used to form a plurality of sources and drains.

5. The liquid crystal display according to claim 3, wherein said metal layer is used to form a plurality of gate electrodes and said sources and drains.

6. The liquid crystal display according to claim 3, wherein said metal layer is used to form a plurality of gate electrodes.

7. The liquid crystal display according to claim 1, wherein said enclosed pattern of each said sealant observation windows is a circle.

8. The liquid crystal display according to claim 7, wherein the gap between two adjacent scale patterns is smaller than a diameter of the sealant observation windows.

9. The liquid crystal display according to claim 1, wherein said enclosed pattern of each said sealant observation windows is an ellipse.

10. The liquid crystal display according to claim 9, wherein the gap between two adjacent scale patterns is smaller than a major radius or a minor radius of the sealant observation windows.

11. The liquid crystal display according to claim 1, wherein said sealant observation windows are arranged in a plurality of columns, a portion of said sealant observation windows arranged in odd columns are aligned along a row direction, and another portion of said sealant observation windows arranged in even columns are aligned along a row direction.

12. The liquid crystal display according to claim 1, wherein the sealant has spacers therein, and parts of the spacers are uniformly accumulated in an inner rim of the sealant observation windows.

* * * * *